United States Patent
Ochi (10) Patent No.: US 9,417,826 B2
(45) Date of Patent: Aug. 16, 2016

(54) IMAGE FORMING APPARATUS WITH STATUS CONTROL

(71) Applicant: Oki Data Corporation, Tokyo (JP)

(72) Inventor: Kengo Ochi, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/462,660

(22) Filed: Aug. 19, 2014

(65) Prior Publication Data

US 2015/0055176 A1 Feb. 26, 2015

(30) Foreign Application Priority Data

Aug. 23, 2013 (JP) ................................ 2013-173626

(51) Int. Cl.
| | |
|---|---|
| *G06F 3/12* | (2006.01) |
| *H04L 29/08* | (2006.01) |
| *H04L 12/24* | (2006.01) |
| *H04L 12/26* | (2006.01) |

(52) U.S. Cl.
CPC ............ *G06F 3/1231* (2013.01); *G06F 3/1204* (2013.01); *G06F 3/1285* (2013.01); *G06F 3/1287* (2013.01); *H04L 41/0873* (2013.01); *H04L 43/0817* (2013.01); *H04L 67/16* (2013.01); *H04L 67/303* (2013.01); *G06F 3/122* (2013.01); *G06F 3/1288* (2013.01)

(58) Field of Classification Search
CPC ... G06F 3/1203; G06F 3/1204; G06F 3/1224; G06F 3/1229; G06F 3/1231; G06F 3/1288; G06F 21/608; G06F 3/1259; G06F 3/1285; G06F 3/87; H04L 41/0873; H04L 43/0817; H04L 67/16; H04L 67/303
USPC ................................................. 358/1.15, 1.14
See application file for complete search history.

(56) References Cited

U.S. PATENT DOCUMENTS

| | | | | |
|---|---|---|---|---|
| 6,734,985 | B1 * | 5/2004 | Ochiai ................... | G06F 3/1204 358/1.14 |
| 2005/0141034 | A1 * | 6/2005 | Ohta ....................... | G06K 15/00 358/1.18 |
| 2009/0225360 | A1 * | 9/2009 | Shirai .......................... | 358/1.15 |
| 2010/0250787 | A1 * | 9/2010 | Miyata ............................. | 710/9 |
| 2012/0194864 | A1 * | 8/2012 | Oshima et al. ................ | 358/1.15 |
| 2013/0003117 | A1 * | 1/2013 | Hirata ..................... | G06F 3/1204 358/1.15 |
| 2013/0044352 | A1 * | 2/2013 | Han et al. ...................... | 358/1.15 |
| 2013/0107319 | A1 * | 5/2013 | Yamada ......................... | 358/1.15 |
| 2013/0148155 | A1 * | 6/2013 | Kitagata ................ | G06F 3/1288 358/1.15 |
| 2014/0036310 | A1 * | 2/2014 | Yokozawa .................... | 358/1.15 |
| 2015/0124282 | A1 * | 5/2015 | Minagawa ............. | G06F 3/1288 358/1.15 |

FOREIGN PATENT DOCUMENTS

| | | |
|---|---|---|
| EP | 2541391 A2 | 1/2013 |
| JP | 2008-146465 A | 6/2008 |
| JP | 2013-012053 A | 1/2013 |

* cited by examiner

Primary Examiner — Benny Q Tieu
Assistant Examiner — Juan M Guillermety
(74) Attorney, Agent, or Firm — Rabin & Berdo, P.C.

(57) ABSTRACT

An information processing apparatus includes a memory and a controller. The memory stores first information therein. The controller is configured to obtain from an external apparatus second information about a status of the information processing apparatus. The second information is held in the external apparatus. The controller then determines based on the second information whether the first information should be deleted from the memory in accordance with the second information.

13 Claims, 7 Drawing Sheets

IMAGE FORMING APPARATUS WITH STATUS CONTROL

BACKGROUND OF THE INVENTION

1. Field of the Invention

The present invention relates to an information processing apparatus and an information processing system, and more particularly to a cloud printing system in which a client'sends a print job to a server, and the server sends the print job to a printer so that the printer prints the print job.

2. Description of the Related Art

Japanese Patent Application No. 2008-146465 discloses a conventional cloud printing system in which a client sends a print job to a server over the Internet, the server sends the print job to a printer over the Internet, and the printer prints the print job.

With such a conventional cloud printing system, even though the user deletes the identification information of the printer from the server, the identification information in the printer is left undeleted, so the user has to delete the identification information from the printer and server individually. This is rather inconvenient.

SUMMARY OF THE INVENTION

The present invention was made in view of the above-described drawbacks.

An object of the invention is to provide a user-friendly information processing apparatus and information processing system.

An information processing apparatus includes a memory and a controller. The memory stores first information therein. The controller is configured to obtain from an external apparatus second information about a status of the information processing apparatus. The second information is held in the external apparatus. The controller then determines based on the second information whether the first information should be deleted from the memory in accordance with the second information.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein.

DETAILED DESCRIPTION OF THE INVENTION

An embodiment of the invention will be described with reference to the accompanying drawings.

Embodiment

{Overall Configuration of Cloud Printing System}

Figure 1:
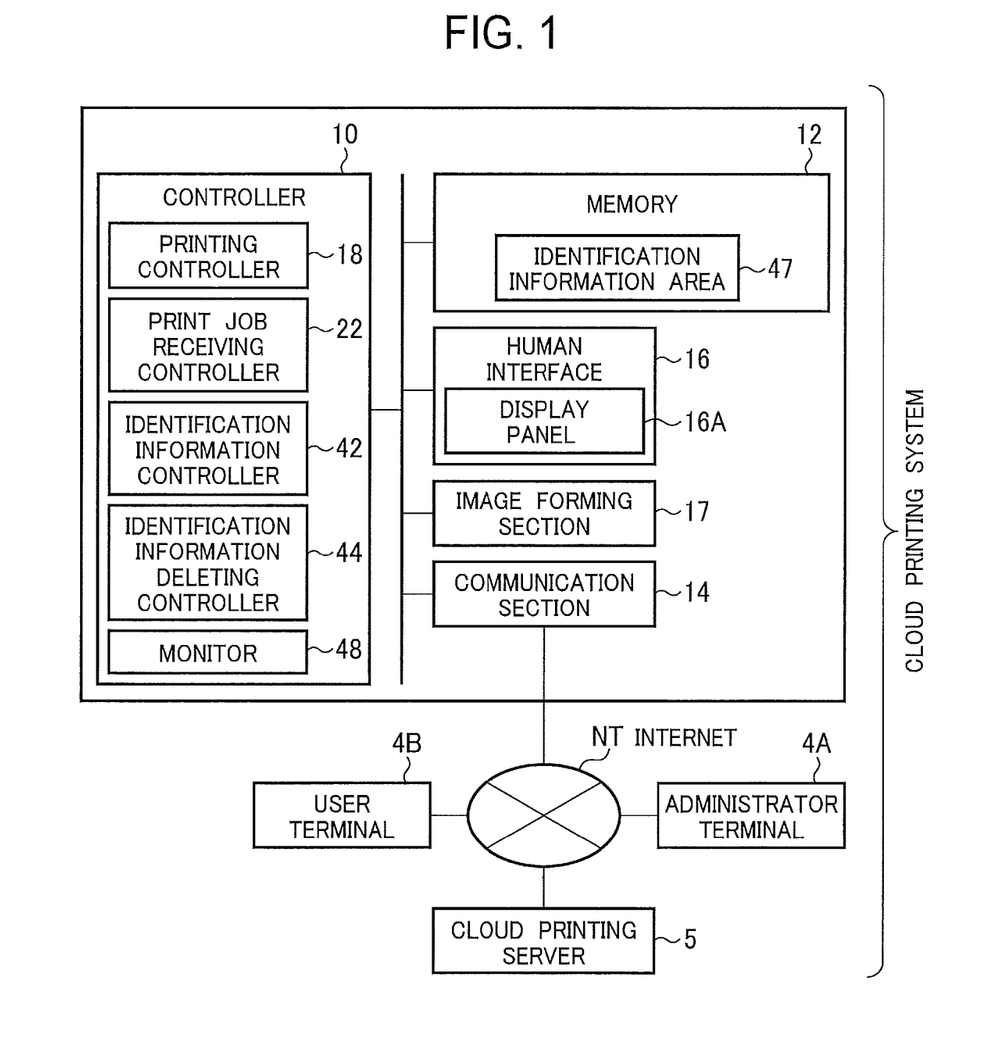
FIG. 1 illustrates a cloud printing system.
Figure 2:
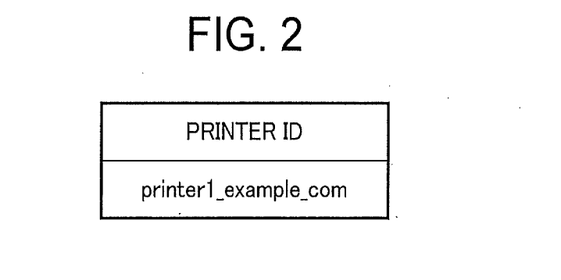
FIG. 2 illustrates the outline of an identification information storing section.

FIG. 1 illustrates a cloud printing system 1 that includes an image forming apparatus, e.g., a printer 2, an administrator terminal 4A, and a user terminal 4B, which are connected to one another via the Internet NT. FIG. 2 illustrates the outline of an identification information storing section 47 (memory). The printer 2 also includes a print engine or an image forming section 17. The image forming section includes a photoconductive drum, a charging unit, an exposing unit, a developing unit, a transfer unit, and a fixing unit, which all cooperate with one another to perform an electrophotographic process.

The cloud printing server 5 includes a memory in which information about the printer 2 (second information) has been registered previously and the printer 2 may be specified as the destination of a print job. The print jobs are sent from the administrator terminal 4A and the user terminal 4B to the printer 2 via the Internet NT.

The administrator terminal 4A takes the form of, for example, a personal computer (PC) or a mobile terminal. The administrator has authority to set the operation of the printer 2, and operates the administrator terminal 4A when the administrator uses "cloud printing". Cloud printing is a printing service in which the printer 2 is accessed via the Internet NT. The administrator terminal 4A permits the administrator to access the printer 2 via the Internet, so that the administrator can set the operating conditions, such as later described services, of the printer 2 in the cloud printing system 1.

The administrator operates the administrator terminal 4A to specify the printer 2 that has been registered with the cloud printing server 5, and sends a print job to the cloud printing server 5.

The user terminal 4B takes the form of, for example, a PC or a mobile terminal, and is operated by the user who has not authority to manage the settings of the printer 2 in the cloud printing system. The user specifies the printer 2 previously registered with the cloud printing server 5, and sends a print job to the cloud printing server 5.

The administrator terminal 4A and user terminal 4B are the clients of the cloud printing server 5, and have substantially the same configuration. In many cases, the administrator terminal 4A, user terminal 4B, and the printer 2 are located on the same floor of a building but may be located in remote buildings.

The cloud printing server 5 is assigned a host name "print.cloud.com" and the printer 2 is, assigned a host name "printer1.example.com".

When the cloud printing server 5 receives a print job from the administrator terminal 4A or the user terminal 4B and stores the print job held in the print job queue in the memory 52, the cloud printing server 5 sends a print job, addition notification to the printer 2, the print job addition notification indicating that the print job has been added to the cloud printing server 5.

After reception of the print job addition notification, the printer 2 receives the print job from the cloud printing server 5, and performs printing of print data of the print job.

{Configuration of Printer}

The printer 2 includes a controller 10 that centrally controls, for example, a memory 12, a communication, section 14 and a human interface 16. The controller 10 includes a central processing unit (CPU) (not shown), and reads programs from the memory 12. The memory 12 may be implemented with a hard disk drive, a flash memory or the like. The controller 10 executes the programs read from the memory 12 to control various sections of the printer 2, thereby performing a variety of processes including printing.

The communication section 14 communicates data with the administrator terminal 4A, user terminal 4B, and cloud printing server 5 over the Internet NT.

The human interface 16 includes an operation panel 16A and a set of keys not shown. The operation panel 16A includes a liquid crystal display (LCD) that displays a variety of setting screens under control of the controller 10, and a touch screen through which the user inputs a variety of selected settings through a corresponding setting screen. The LCD and touch screen are of the integral construction. The set of keys include a copy screen display key, a print screen display key, a scan screen display key, a facsimile screen display key, a start key, a stop/clear key, a power key, and numeric keys. The human interface 16 outputs commands to the controller 10 in response to the user operating the operation panel 16A or the set of keys.

The memory 12 holds sources of web pages (referred to as apparatus web page) in the format of hyper markup language (HTML) to display a variety of settings for the printer 2 on the display units of the printer terminal 4A and the user terminal 4B. The memory 12 holds the apparatus webs that are to be displayed when accessed by the administrator terminal 4A or the user terminal 4B. The contents of the apparatus webs, are different for the administrator terminal 4A and the user terminal 4B, which have different levels of authority in setting the printer 2.

The memory 12 has an identification information area 47. The identification information area 47 holds a printer ID (first information) received from the cloud printing server 5, the printer ID being a unique identification information indicative of the printer 2 in the cloud printing service. The printer 2 obtains the printer ID from the cloud printing server 5, the printer ID being used when the printer 2 is used to print the cloud printing service. In the embodiment, the identification information area 47 holds the printer ID expressed by a string of characters, e.g., "printer1_example_com", which is representative of the printer 2.

The controller 10 includes a printing controller 18, a print job receiving controller 22, an identification information registering controller 42, an identification information deleting controller 44, and a monitor 48 (controller).

The printing controller 18 (image forming section) receives a print job from the cloud printing server 5 over the Internet NT, and prints the print data, which is contained in the print job, on a sheet-like print medium.

The print job receiving controller 22 obtains the print job from the cloud printing server 5. The print job receiving controller 22 sends the received print job to the printing controller 18, which in turn prints the print data.

Prior to using the cloud printing service, the identification information registering controller 42 sends an identification information registration request to the cloud printing server 5 when the operator operates the operation panel 16A or the administrator operates the administrator terminal 4A through the apparatus web page, thereby registering the printing ID with the cloud printing server 5.

When logging off the cloud printing service, the identification information deleting controller 44 sends an identification information deletion request to the cloud printing server 5 in response to the user operation at the operation panel 16A or the administrator's operation at the administrator terminal 4A through the apparatus web page, thereby deleting the printer ID from the cloud printing server 5.

The monitor 48 checks the cloud printing server 5 to determine whether the cloud printing server 5 holds the printer ID indicative of the printer 2, thereby ensuring that the printer ID held in the identification information area 47 is currently valid.

{Configuration of Cloud Printing Server}

Figure 3:
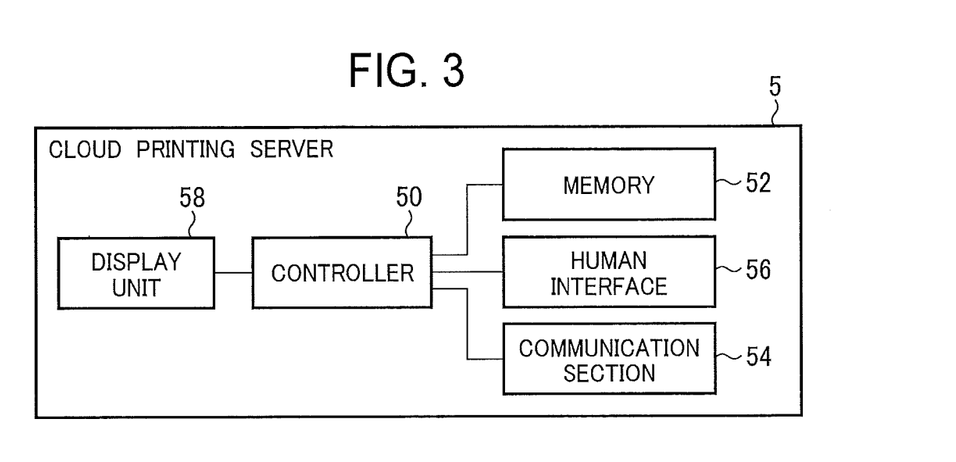
FIG. 3 illustrates the configuration of a cloud server.

FIG. 3 illustrates the configuration of the cloud server 5. A controller 50 of the cloud printing server 5 centrally controls various sections including a memory 52, a human interface 56, a communication section 54, and a display unit 58. The controller 50 is implemented mainly with a CPU (not shown), which reads out programs from the memory 52 implemented with a ROM, a RAM, a hard disk drive or a flash memory, and executes the programs to control corresponding sections for performing a variety of processes.

The communication section 54 communicates the data with the printer 2, the administrator terminal 4A, and the user terminal 4B over the Internet NT.

Upon reception of the identification information registration request from the printer 2 through the communication section 54, the controller 50 issues the printer ID and sends the issued the printer ID to the printer 2 through the communication section 54.

The controller 50 registers the printer ID with a cloud printer list held in the memory 52, the printer ID being associated with the account of the administrator of the printer 2 to which the printer ID is assigned. The cloud printer list holds printer IDs available in the cloud printing system 1, different printer IDs being associated with different administrator accounts, a single printer ID for each account. For example, the administrator may perform a process in which the administrator and a user share the printer 2, thereby authorizing the user to use the shared printer 2.

Upon reception of the identification information deletion request from the printer 2 via the communication section 54, the controller 50 deletes the printer ID indicative of the printer 2 from the cloud printer list.

The memory 52 holds a print job queue in which print jobs to be printed are queued for each printer to which a printer ID registered with the cloud printer list is assigned.

The human interface 56 includes, for example, a key board and a mouse, and receives commands from the operator. The display unit 58 includes, for example, a liquid crystal display (LCD), and displays the image data received from the controller 50.

{Configuration of Administrator Terminal and User Terminal}

Figure 4A:
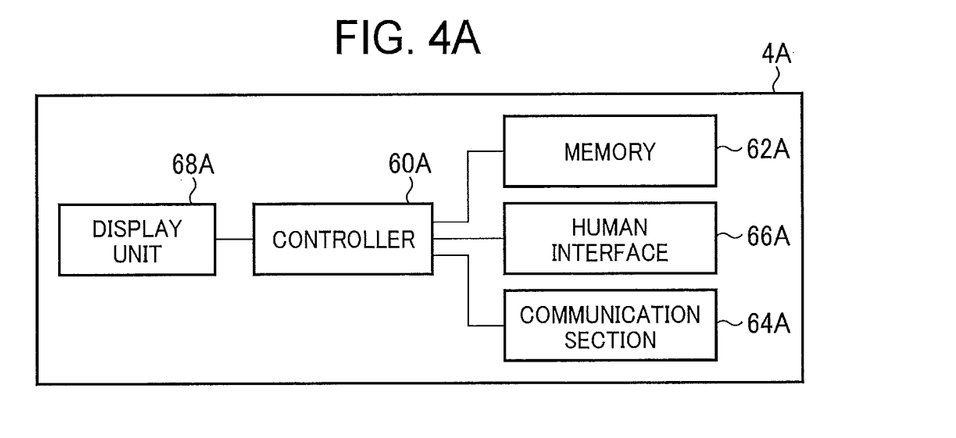
FIGS. 4A and 4B illustrate the configuration of an administrator terminal and a user terminal, respectively.
Figure 4B:
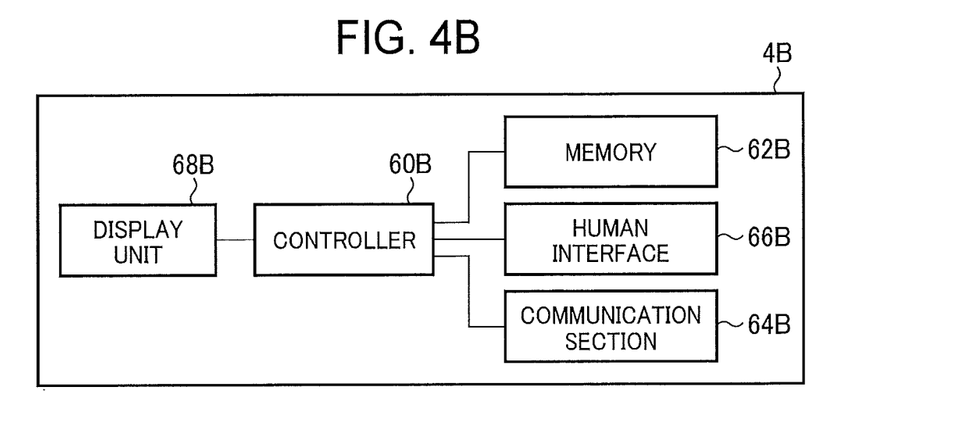

FIGS. 4A and 4B illustrate the configuration of the administrator terminal. 4A and user terminal 4B, respectively. The administrator terminal 4A and user terminal 4B are substantially identical and therefore only the administrator terminal 4A will be described below.

As shown in FIG. 4A, the controller 60A of the administrator terminal 4A centrally controls the respective sections including a memory 62A, a human interface 66A, a communication section 64A, and a display unit 68A. The controller 60A is implemented primarily with a central processing unit (CPU), which reads respective programs from the memory 62A. The memory 62A takes the form of a ROM, a RAM, a hard disk drive, or a flash memory, to perform various processes.

The communication section 64A communicates data with the printer 2 and the user terminal 4B over the Internet NT. The memory 62A holds a variety of print jobs. The controller 60 reads a print job from the memory 62A, and specifies a printer before sending the print job to the cloud printing server 5.

The human interface 66A is implemented with, for example, a keyboard and a mouse, and receives the commands from the administrator. The display unit 68A is implemented with, for example, a liquid crystal display (LCD), and display image data of an apparatus web page of the printer 2 received from the controller 60A.

Just like the administrator terminal 4A, the controller 60B of the user terminal 4B centrally controls the respective sections including a memory 62B, a human interface 66B, a communication section 64B, an a display Unit 68B.

{Printing Process}

Figure 5A:
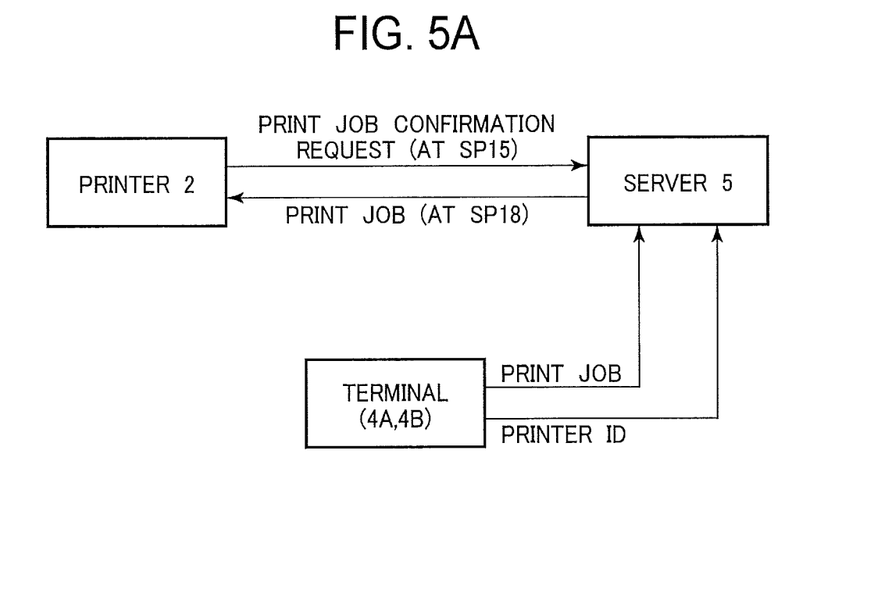
FIG. 5A is a block diagram illustrating the flow of a print job and the signals associated with the print job.
Figure 5B:
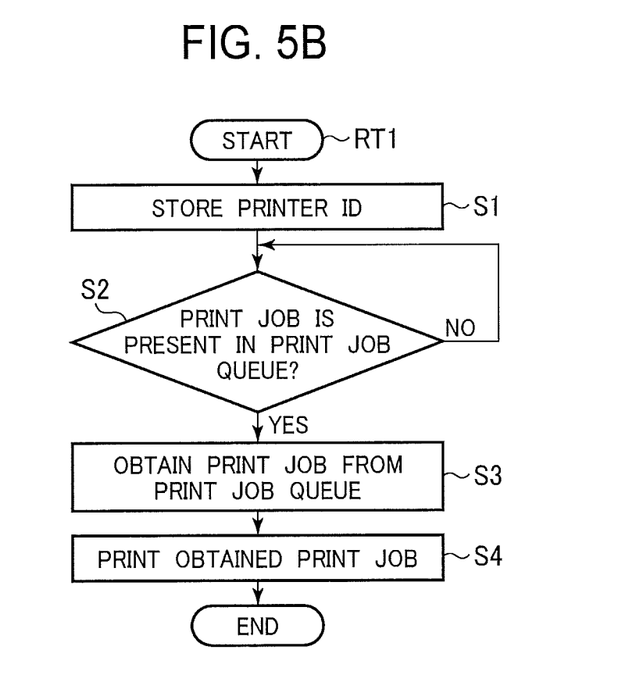
FIG. 5B is a flowchart illustrating a specific printing process.

Assume that the administrator wants to print a document. FIG. 5A is a block diagram illustrating the flow of a print job and the signals associated with the print job. FIG. 5B is a flowchart illustrating the specific printing process of the print job. With reference to FIGS. 5A and 5B, a description will be given of the printing process performed by the printer 2.

Referring to FIG. 5A, the administrator operates the operation panel 16A or the apparatus web page displayed on the display unit 68A to send the identification information registration request to the cloud printing server 5, thereby registering the printer 2 with the cloud printing server 5. The administrator actually sends a printer ID. The administrator also sends a print job to the cloud printing server 5. The controller 50 of the cloud printing server 5 then registers the printer ID with the cloud printer list held in the memory 52. The controller 50 also adds the print job to the print job queue. The cloud printing server 5 then sends the print job, the print job addition notification, and the printer ID of the printer 2 (i.e., a command to register the printer ID) to the printer 2. Upon reception of the print job and the command to register the printer ID, the controller 10 of the printer 2 reads the printing program from the memory 12, and executes the printing program to perform a printing process RT1 shown in FIG. 5B.

At S1, the identification information registering controller 42 of the controller 10 obtains the printer ID for the printer 2 from the cloud printing server 5, and stores the printer ID in the identification information area 47.

At S2, the print job receiving controller 22 of the controller 10 makes a decision to determine whether a print job to be printed by the printer 2 is present in the print job queue in the cloud printing server 5. If the answer is NO, it follows that no print job is present in the print job queue.

At S2, if the answer is YES, it follows that a print job is present in the print job queue. The process proceeds to S3 where the controller 10 obtains the print job from the print job queue.

At S4, the controller 10 drives the printing controller 18 to print the obtained print job, and then completes the printing process RT1.

Figure 6:
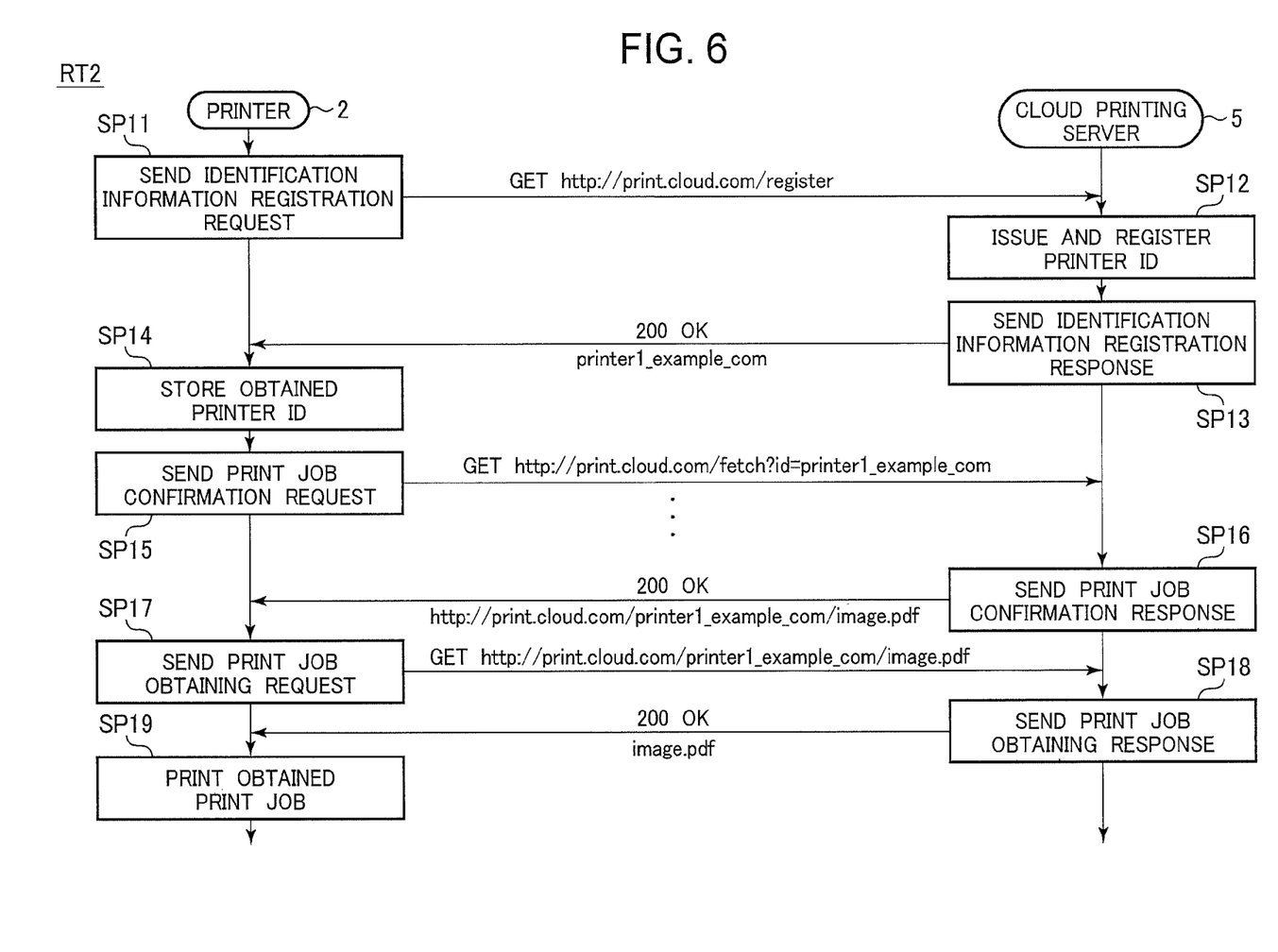
FIG. 6 is a sequence chart illustrating a printing sequence process.

FIG. 6 is a sequence chart illustrating a printing sequence process RT2. With reference to the sequence chart shown in FIG. 6, a description will be given of the printing sequence process RT2 performed by the cloud printing system 1. The sequence will be described in terms of the communication between the printer 2 and the cloud printing server 5.

At SP11, the controller 10 of the printer 2 drives the identification information registering controller 42 to send an identification information registration request to the cloud printing server 5. Specifically, the identification information registering controller 42 sends a GET command to "http://print.cloud.com/register", which is the universal resource locator (URL) of the cloud printing server 5 connected on the Internet NT.

Upon reception of the identification information registration request, the controller 50 issues at SP12 a printer ID for the printer 2, "printer1_example_com," and registers the printer ID with the cloud printer list held in the memory 52. At SP13, the controller 50 sends an identification information registration response. Specifically, the controller 50 sends out "200 OK" indicative of the normal response and the printer ID "printer1_example_com" to the printer 2.

Upon reception of the identification information registration response through the identification information registering controller 42, the controller 10 of the printer 2 stores the obtained printer ID into the identification information area 47 at SP14. At SP15, the print job receiving controller 22 sends a print job confirmation request (second information request) to the cloud printing server 5. Specifically, the identification information registering controller 42 sends a GET command to "http://print.cloud.com/fetch?id=printer1_example_com" which is a URL of the print job queue for the printer 2 held in the cloud printing server 5 connected on the Internet NT.

At S15, the print job receiving controller 22 of the controller 10 sends out the print job confirmation request to inquire of the cloud printing server 5, whether a print job is present in the print job queue, the print job confirmation request being sent until the print job receiving controller 22 obtains a print job from the cloud printing server 5. In other words, SP11-SP14 are performed only when the printer 2 is registered with the cloud printing server 5, and thereafter the print job confirmation request is sent out at regular intervals or when the user commands so that steps 15-19 are performed.

Upon reception of the print job confirmation request, the controller 50 of the cloud printing server 5 sends the print job confirmation response to the printer 2 at SP16 if a print job is present in the print job queue for the printer held in the memory 52. Specifically, the controller 50 sends "200 OK" indicative of a normal response and "http://print.cloud.com/printer1_example_com/image.pdf" to the printer 2. If no print job is present in the print job queue, the controller 50 sends "200 OK" and a "null" indicating that no print job is present to the printer 2.

Upon reception of the print job confirmation request, the print job receiving controller 22 of the controller 10 of the printer 2 sends a print job obtaining request to the cloud printing server 5 at SP17. Specifically, the print job receiving controller 22 sends a GET command to http://print.cloud.com/printer1_example_com/image.pdf", which is the URL from which the print job is obtained.

Upon reception of the print job obtaining request, the controller 50 of the loud printing server 5 sends a print job obtaining response to the printer 2 at SP18. Specifically, when the print job receiving controller 22 of the printer 2 receives the print job obtaining request, the controller 50 sends to the printer 2 "200 OK" indicative of the normal response and "image.pdf", which is the data of the print job. At SP 19, the printing controller 18 drives the image forming section 17 to print the print job.

{Identification Information Confirming Process}

Figure 7:
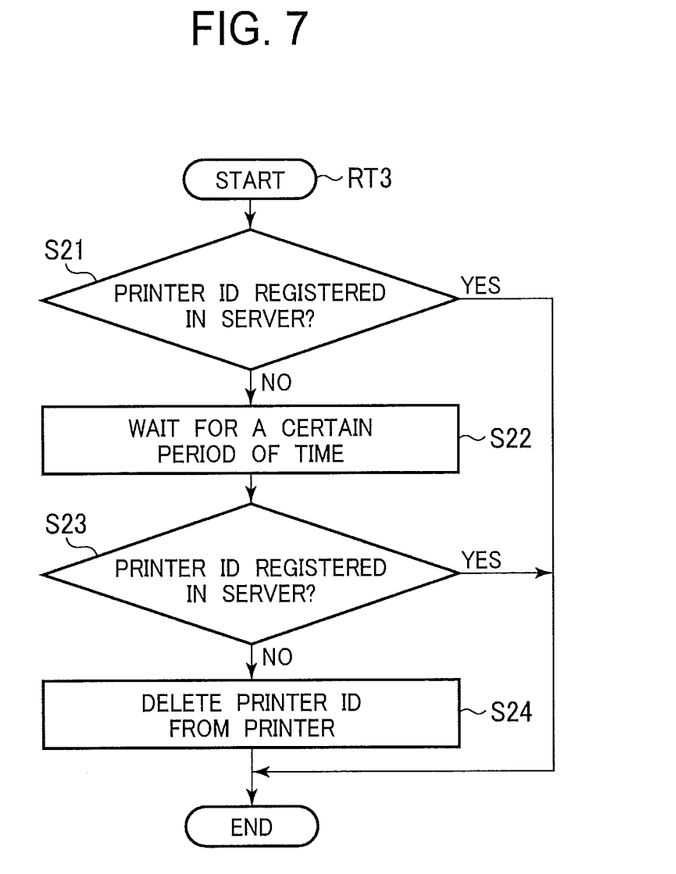
FIG. 7 is a flowchart illustrating an identification information confirming process.

FIG. 7 is a flowchart illustrating an identification information confirming process RT3. With reference to FIG. 7, a description will be given of the specific identification information confirming process RT3 performed by the printer 2. Upon power-up of of the printer 2, the controller 10 reads an identification information confirming program from the memory 12, and executes the program, thereby starting an identification information confirming process RT3.

At S21, the controller 10 drives the monitor 48 to inquire whether the cloud printer list of the cloud printing server 5 holds the printer ID for the printer 2.

At S21, if the answer is YES, it follows that the cloud printer list of the cloud printing server 5 still holds the printer ID indicative of the printer 2. Thus, the process ends.

At S21, if the answer is NO, it follows that the cloud printer list does not hold the printer ID for the printer 2. Thus, the process proceeds to S22 where the controller 10 waits a predetermined period of time, and then proceeds to S23.

At S23, the controller 10 again makes a decision as to whether the cloud printer list in the cloud printing server 5 holds the printer ID for the printer 2.

At S23, if the answer is YES, it follows that the cloud printer list holds the printer ID at S23 though the cloud printer list did not hold the printer ID at S21. Thus, the identification information confirming, process RT3 ends.

At S23, if the answer is NO, it follows that the cloud printer list does not hold the printer ID at both S21 and S23. Thus, the process proceeds to S24.

At S24, the controller 10 drives the monitor 48 to delete the "printer1_example_com," which is the printer ID for the printer 2, from the identification information area 47. The process RT3 then ends.

{When Server holds Printer ID}

Figure 8:
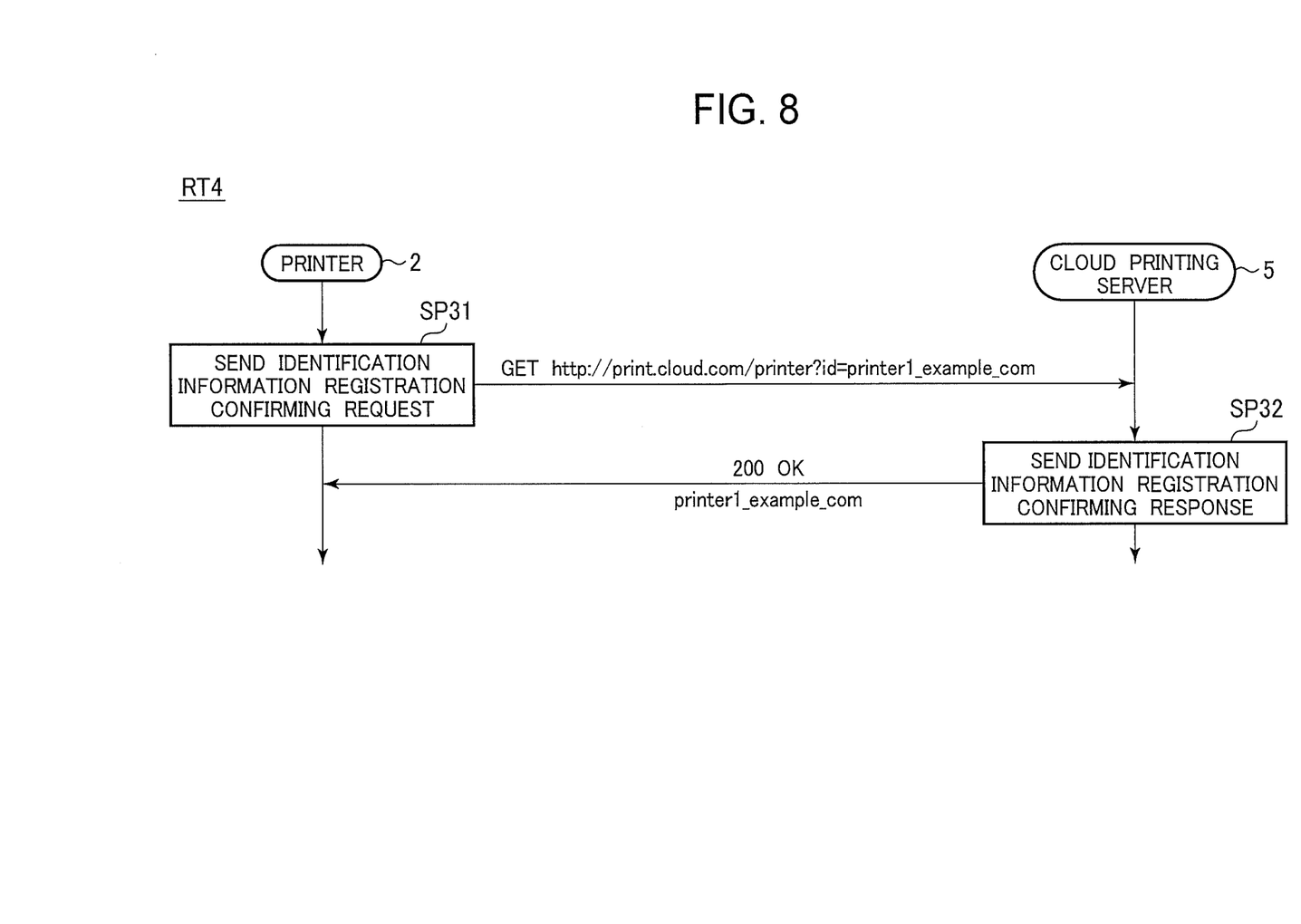
FIG. 8 is a sequence chart illustrating an identification information confirming process.

FIG. 8 illustrates an identification information confirming process RT4 in which the printer 2 successfully confirms through a single inquiry that the printer ID for the printer 2 has been registered with the cloud printing server 5. With reference to the sequence chart in FIG. 8, a description will be given of the identification information confirming process RT4 when the identification information can be confirmed.

At SP31, the controller 10 of the printer 2 drives the monitor 48 to send an identification information registration confirming request to the cloud printing server 5. Specifically, the monitor 48 sends a GET command to http://print.cloud.com/printer?id=printer1_example_com," which is a URL in which the printer ID for the printer 2 is associated with the URL of the cloud printer list held in the cloud printing server 5 connected to the Internet NT.

Upon reception of the identification information registration confirming request, the controller 50 of the cloud printing server 5 checks the cloud printer list held in the memory 52, thereby determining that the printer ID for the printer 2 has been registered with the cloud printer list. The controller 50 then sends an identification information registration confirming response to the printer 2 at SP32. Specifically, the controller 50 sends "200 OK" indicative of the normal response and "printer1_example_com" which is the printer ID for the printer 2. Thus, the controller 10 of the printer 2 does not drive the monitor 48 to delete the printer ID from the identification information area 47.

{When Server Holds No Printer ID}

Figure 9:
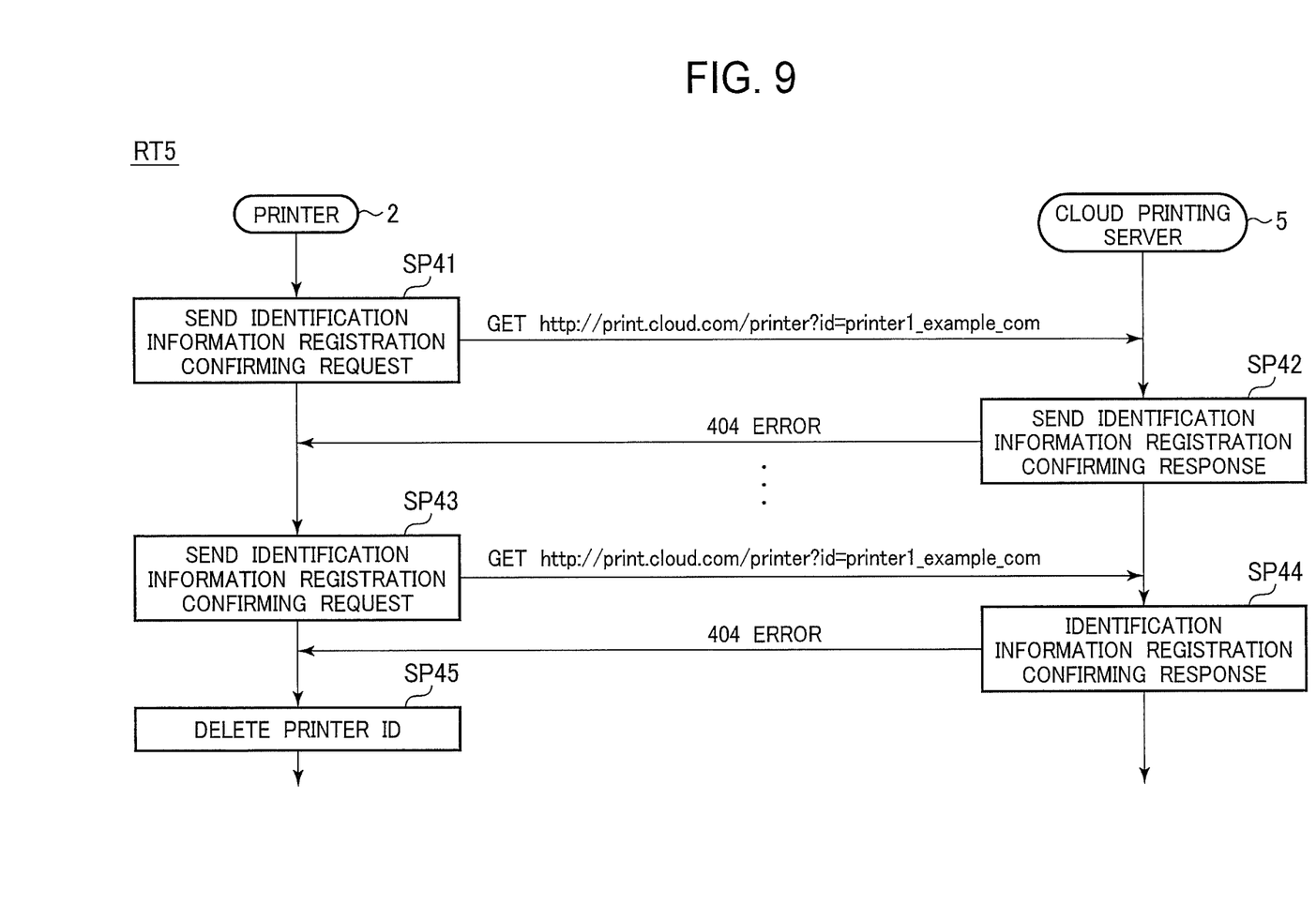
FIG. 9 is a sequence chart illustrating an identification information confirming process.

FIG. 9 is a sequence chart illustrating an identification information confirming process RT5 in which the printer 2 does not successfully confirm through a single inquiry that the printer ID for the printer 2 has been registered with the cloud printing server 5. With reference to FIG. 9, a description will be given of the identification information confirming process RT5 when the identification information cannot be confirmed.

At SP41, the controller 10 of the printer 2 drives the monitor 48 to send an identification information registration confirming request to the cloud printing server 5. Specifically, the monitor 48 sends a GET command to http://print.cloud.com/printer?id=printer1_example_com," which is a URL in which the printer ID for the printer 2 is associated with the URL of the cloud printer list held in the cloud printing server 5 connected to the Internet NT.

Upon reception of the identification information registration confirming request, the controller 50 of the cloud printing server 5 checks the cloud printer list held in the memory 52, thereby determining that the printer ID for the printer 2 has not been registered with the cloud printer list. At SP42, the controller 50 sends an identification information non-registration confirming response to the printer 2. Specifically, the controller 50 sends to the printer "400 ERROR" indicating that the identification information has not been registered with the cloud printing list.

Upon reception of "400 ERROR" or the identification information non-registration confirming response, the controller 10 of the printer 2 waits a predetermined period of time. At SP43, the controller 10 again sends the identification information registration confirming request to the cloud printing server 5. In other words, the controller 10 sends the identification information registration confirming request if the controller 10 does not receive within a prior of time the identification information registration confirming request.

Upon reception of the identification information registration confirming request, the controller 50 of the cloud printing server 5 checks the cloud printer list held in the memory 52, thereby determining that the cloud printer list does not hold the printer ID for the printer 2. At SP44, the controller 50 again sends "400 ERROR."

Upon reception of the "400 ERROR", the controller 10 of the printer 2 drives the monitor 48 to delete "printer1_example_com," which is the printer ID for the printer 2, from the identification information area 47.

As described above, upon reception of the identification information non-registration confirming response indicating that the identification information has not been registered, the controller 10 of the printer 2 waits a predetermined period of time, and again inquires of the cloud printing server 5 whether the printer ID has been registered. In other words, when the controller 10 receives the identification information non-registration confirming response two consecutive times, the controller 10 determines that the cloud printing server 5 does not hold the printer ID. In this way, the printer 2 can confirm with improved reliability that the cloud printing server 5 does not hold the printer ID for the printer 2.

{Effects}

With the configuration described above, the printer 2 inquires of the cloud printing server 5 whether the printer ID has been registered with the cloud printing server 5. If it is determined that the printer ID has not been registered, the printer ID is deleted from the identification information area 47.

In this manner, the cloud printing system 1 is configured such that once the user deletes the printer ID held in the cloud printing server 5, the printer ID held in the printer 2 is automatically deleted without intervention of the user, thereby relieving the user of the problem of deleting the printer ID from the printer 2 explicitly.

Conventionally, when the administrator operates the administrator terminal 4A to delete the printer ID for the printer 2 from the cloud printing server 5, the cloud printing server 5 does not notify the printer 2 of the deletion of the printer ID. Therefore, the printer 2 may inquire of the cloud printing server 5 despite the fact that a print job cannot be received from the cloud printing server 5 due to the deletion of the printer ID from the cloud printer list.

In contrast, the embodiment enables the printer 2 to inquire of the Cloud printer list whether the printer ID has been deleted from the cloud printer list. Therefore, when the printer ID has been deleted from the cloud printer list, the printer 2 is prevented from making unnecessary inquiries of the cloud printing server 5. This prevents the printer 2 from performing unnecessary operations.

The above-described configuration includes the following.

(1) The printer 2 has the memory 12 that stores the printer ID (first information), which is received from the cloud printer server 5 and is the same printer ID stored in the cloud printing server 5.

(2) The controller 10 of the printer 2 drives the monitor 48 to send the identification information registration confirming request to the cloud printing server 5, inquiring whether the printer ID has been registered with the cloud printing server 5. In accordance with whether the printer ID for the printer 2 is present or absent in the cloud printing server 5, the monitor 48 of the printer 2 decides whether the printer ID should be deleted from the memory 12.

(3) The memory 52 of the cloud printing server 5 stores the status of the printer 2.

(4) The cloud printing server 5 includes the controller 50 that sends a response to the printer 2, the response indicating the status of the printer 2 held in the memory 52.

This configuration prevents the printer ID from being left in the printer 2 when the printer ID is deleted from the cloud printing server 5.

The present invention prevents a problem of a cloud printing system that someone who bought such an old, used printer or a secondhand printer may maliciously use the ID left in the printer.

Modifications

The above embodiment has been described in the context of the printer 2 that receives the identification information non-registration confirming response two consecutive times from the cloud printing server 5, the identification information non-registration confirming response indicating that the identification information has not been registered with the cloud printing server 5, two consecutive times. Alternatively, it may be determined that the cloud printing server 5 does not hold the printer ID when the printer 2 receives identification information non-registration confirming response only one time or three consecutive times or more.

If the printer 2 receives the identification information non-registration confirming response a predetermined period of time or longer after the printer 2 has sent out the identification information non-registration confirming request, the identification information non-registration confirming response may be less reliable due to errors occurred in the network. Thus, the identification information registration confirming request may be sent again.

The cloud printing system 1 may also be configured as follows: Assume that the cloud printing system 1 is configured such that the printer 2 determines that the cloud printing server 5 does not hold the printer ID if the printer 2 receives the identification information non-registration confirming response two consecutive times. When the printer 2 has, received the identification information non-registration confirming response a predetermined period of time or longer after the printer 2 has sent out the identification information registration confirming request, the printer 2 determines that the cloud printing server 5 does not hold the printer ID, only after the identification information non-registration confirming response has been received three or four consecutive times. In other words, the cloud printing system 1 may be configured such that the user is allowed to preset the number of times the identification information non-registration confirming response should be received before it is determined that the cloud printing server 5 does not hold the printer ID.

The above embodiment has been described in terms of an exemplary case in which when the printer 2 is turned on, the printer 2 makes an inquiry as to whether the printer ID for the printer 2 is present in the cloud printing server 5 (FIG. 7). The present invention is not limited to this configuration, and may be modified such that the printer 2 makes inquiries at regular intervals.

In response to the user's operation at the user terminal 4B, the printer 2 may inquire of the cloud printing server 5 as to whether the cloud printing server 5 holds the printer ID. The configuration enables the user to check whether the printer ID is actually present in the cloud printing server 5, if the printer 2 does not print the print job despite the fact that the user has registered the print job to be printed by the printer 2 with the cloud printing server 5. Alternatively, the system may be configured to determine that the printer ID has been registered in the cloud printing server 5 if the printer 2 receives the identification information non-registration confirming response from the cloud printing server 5 a predetermined number of consecutive times.

The present invention may be modified such that when the printer ID is deleted from the cloud printing server 5, the display panel 16A displays the deletion of the printer ID to the user.

The embodiment has been described in the context of deletion of the printer ID identifying the printer 2 from the identification information area 47. The invention is not limited to this and may be applied to deletion of a variety of items of information including the URL of the cloud printing server 5 and information required for authenticating the cloud printing server 5 when the printer 2 is connected to the cloud printing system 1.

The printing system 1 may also be configured such that the administrator terminal 4A and user terminal 4B inquire of the cloud printing server 5 as to whether information about the administrator terminal 4A and user terminal 4B are held in the cloud printing server 5. If the information about the administrator terminal 4A and user terminal 4B has been deleted, the information held in the administrator terminal 4A and user terminal 4B is also deleted.

The present invention may be applied to an exemplary case in which an information processing apparatus inquires of an external apparatus and the information is then deleted from the information processing apparatus if the response from the external apparatus indicates that the information has been deleted from the external apparatus.

The embodiment has been described with respect to a single printer connected to the Internet NT. The invention is not limited to this and more than one printer may be connected to the Internet NT, in which case different printers are assigned different printer IDs, which are registered with the cloud printer list held in the memory 52 in the cloud printing server 5.

The embodiment has been described in terms of a single administrator terminal 4A and a single user terminal 4B which are connected to the Internet NT. The invention is not limited to this and a predetermined number of user terminals 4B and administrator terminals 4A may be connected to the Internet NT.

The embodiment has been described in terms of the administrator terminal 4A separate from the user terminal 4B.

Instead, the administrator terminal 4A and the user terminal 4B may be implemented with a single terminal so that different apparatus web pages appear on a display unit for the administrator and the user.

The embodiment has been described with respect to an exemplary case in which the printer 2, user terminal 4B, administrator terminal 4A, and cloud printing server 5 are connected on the Internet NT. The present invention is not limited to this. The printer 2, user terminal 4B, administrator terminal 4A, and cloud printing server 5 may also be connected via a variety of communication means including USB cables, cable LAN, or wireless LANs that conform to Institute of Electrical and Electronics Engineer (IEEE) 802. 3u/ab or IEEE802.11a/b/g/n.

The embodiment has been described with respect to the cloud printing system 1 in which the printer 2 prints the print jobs received from the clients, i.e., the administrator terminal 4a or the user terminal 4B over the Internet NT. The invention may also be applicable to a system in which a server receives a variety of content data over the internet NT from the clients and a predetermined piece of equipment downloads the data from the server.

The embodiment has been described in terms of a printer. The present invention may also be applicable to various types of equipment including copying machines, multi-function peripherals, and FAX machines.

In the embodiment, the printer as an information processing apparatus includes the memory 12 and the monitor 48. Instead, the information processing apparatus may be configured using another type of memory means and the monitoring means.

In the embodiment, the cloud printing system 1 as an information processing system includes the printer 2 as an information processing apparatus that includes the memory 12 and monitor 48, and a cloud printing server 5 as a server that includes the memory 52 and the controller 50. The present invention may be applied to an image forming system that includes an information processing apparatus that includes a memory and a monitor of various types and a server that includes a server memory and a controller.

The present invention may be applied to a variety of types of electronic equipment including computers that sends printing jobs to printers, image scanners, facsimile machines, and copying machines that perform various processes on image data.

What is claimed is:

1. An image forming apparatus, comprising:
a memory configured to store first information indicative of the image forming apparatus;
a communication section configured to receive second information from an external apparatus, and to send, after an elapse of a preset period of time, third information that includes the first information to the external apparatus;
a controller configured to operate in accordance with the second information; and
an image forming section configured to execute a print job using a print medium upon reception of the print job from the external apparatus, wherein
the communication section receives a plurality of pieces of the second information from the external apparatus, each piece being of one of a plurality of types, which include a first type indicating that the first information does not remain registered with the external apparatus, and
the controller does not delete the first information from the memory upon first reception of the second information of the first type, and delete the first information from the memory after receiving the second information of the first type a plurality of times.

2. The image forming apparatus according to claim 1, wherein when a received piece of the second information has a type that is not the first type, the controller sends a request-for-second information to the external apparatus requesting another piece of the second information.

3. The image forming apparatus according to claim 2, wherein the controller, after sending the request-for-second information, again sends the request-for-second information to the external apparatus if the controller does not receive the second information of the first type within a period of time.

4. The image forming apparatus according to claim 2, wherein when the controller receives the second information more than a predetermined period of time after the controller sent the request-for-second information to the external apparatus, the controller again sends the request-for-second information to the external apparatus.

5. The image forming apparatus according to claim 1, further comprising a display unit on which a variety of items of information are displayed, wherein when the controller has deleted the first information from the memory, the controller causes the display unit to display information indicative that the first information has been deleted.

6. The image forming apparatus according to claim 1, further comprising a print job obtaining section receives the print job together with the first information from the external apparatus.

7. The information processing system according to claim 6, wherein the print job obtaining section receives the print job together with the identification first information from the server.

8. The image forming apparatus according to claim 1, wherein the second information of the first type includes error information.

9. The image forming apparatus according to claim 8, wherein when a received piece of the second information has a type that is not the first type, the controller sends a request-for-second information to the external apparatus requesting another piece of the second information.

10. The image forming apparatus according to claim 9, wherein the controller, after sending the request-for-second information, again sends the request-for-second information to the external apparatus if the controller does not receive the second information of the first type within a period of time.

11. An image forming apparatus, comprising:
a communication section configured to receive from an external apparatus first information indicative of the image forming apparatus, and to be continuously ready to communicate with the external apparatus;
a memory configured to store the received first information;
a controller configured
to send a request for registering the image forming apparatus to the external apparatus,
to obtain from the external apparatus second information about a status of the image forming apparatus held in the external apparatus,
to determine based on the second information whether the first information should be deleted from the memory, and
to cause deletion of the first information from the memory upon detecting from the second information that the first information does not remain registered with the external apparatus;

a print job obtaining section configured to obtain a print job from the external apparatus; and an image forming section configured to execute the print job using a print medium, wherein the controller sends a request-for-second information to the external apparatus through the communication section, and receives the second information in response to the request-for-second information, wherein the first information is identification information that identifies the image forming apparatus, and the external apparatus is a server with which the identification information should be registered, wherein when the second information does not indicate that the identification information has been registered with the server, the controller again sends the request-for-second information to the server, and wherein when the controller receives a number of consecutive times the second information not indicative that the identification information remains registered with the server, the controller determines that the identification information does not remain registered with the server.

12. The image forming apparatus according to claim 11, wherein the controller presets the number of consecutive times in accordance with a response of the server responding to the request-for-second information.

13. An information processing system, comprising:

an information processing apparatus, and a server, wherein the information processing apparatus includes:
  a first memory configured to store first information that identifies the information processing apparatus;
  a first communication section configured to receive from the server second information and to send, after an elapse of a preset period of time, third information that includes the first identification information to the server;
  a first controller configured to operate in accordance with the second information;
  an image forming section configured to execute a print job using a print medium upon reception of the print job from the server, wherein the server includes
  a second memory configured to store identification information,
  a second communication section configured to communicate with the information processing apparatus, and
  a second controller configured to modify the second information when the second communication section receives the third information that includes the first information, the second information being modified based on the received first information and the stored identification information, wherein the first communication section receives a plurality of pieces of second information from the server, each piece being of one of a plurality of types, which include a first type indicating that the first information does not remain registered with the server, and a second type that identifies the print job, wherein the second controller, upon determining that the identification information stored in the second memory does not include the first information, generates the second information of the first type, and wherein the first controller does not delete the first information from the first memory upon first reception of the second information of the first type, and delete the first information from the first memory after receiving the second information of the first type a plurality of times.

* * * * *